US009450898B2

(12) United States Patent
Kurupacheril et al.

(10) Patent No.: US 9,450,898 B2
(45) Date of Patent: Sep. 20, 2016

(54) SHARED RESOURCE AND SESSION MODEL USING PRESENCE DATA

(71) Applicant: Futurewei Technologies, Inc., Plano, TX (US)

(72) Inventors: Francis Kurupacheril, Cupertino, CA (US); Frederick P. Block, Westminster, CO (US)

(73) Assignee: Futurewei Technologies, Inc., Plano, TX (US)

( * ) Notice: Subject to any disclaimer, the term of this patent is extended or adjusted under 35 U.S.C. 154(b) by 265 days.

(21) Appl. No.: 13/655,731

(22) Filed: Oct. 19, 2012

(65) Prior Publication Data

US 2014/0115068 A1   Apr. 24, 2014

(51) Int. Cl.
| | |
|---|---|
| *G06F 13/00* | (2006.01) |
| *H04L 12/58* | (2006.01) |
| *H04L 12/18* | (2006.01) |
| *G06Q 10/10* | (2012.01) |

(52) U.S. Cl.
CPC ............ *H04L 51/043* (2013.01); *G06Q 10/109* (2013.01); *H04L 12/1813* (2013.01); *H04L 12/1818* (2013.01)

(58) Field of Classification Search
CPC ............. H04L 12/5815; H04L 51/043; H04L 29/06027; H04L 12/1813; H04L 12/1818; H04L 12/1822; H04L 12/5695; H04L 51/04; H04L 65/1066; H04L 67/24; H04L 67/14; H04L 67/142; H04M 3/567; H04M 3/42374; H04M 2203/5054; H04M 3/565; H04M 2203/5063; H04M 2203/352; H04M 3/563; H04M 2201/40; H04N 7/147; H04N 7/15; G06Q 10/109; G06Q 10/10

USPC ......... 709/203, 204–206, 227–229, 225, 226, 709/223, 224; 348/14.09, 14.03; 379/202.01; 715/203, 751–759

See application file for complete search history.

(56) References Cited

U.S. PATENT DOCUMENTS

| | | | |
|---|---|---|---|
| 6,385,461 B1 | 5/2002 | Raith | |
| 8,145,584 B2 * | 3/2012 | Juan | ............... G06Q 10/10 705/319 |

(Continued)

FOREIGN PATENT DOCUMENTS

| | | | |
|---|---|---|---|
| CN | 1976434 A | * | 6/2007 |
| CN | 101141612 A | | 3/2008 |
| EP | 1209849 A2 | | 5/2002 |

OTHER PUBLICATIONS

"Cisco Jabber Voice for TelePresence—User Guide for Windows," Cisco, Software Version 4.5, 14409.09, Oct. 2012, 21 pages.

(Continued)

*Primary Examiner* — Kenneth R Coulter
(74) *Attorney, Agent, or Firm* — Conley Rose, P.C.; Grant Rodolph; Jonathan K. Polk

(57) ABSTRACT

A method implemented in a communication device, the method comprising receiving a context preference for a contact, storing the context preference, connecting to a communication session via the communication device, transmitting, for display at a second communication device, context information based on the context preference and presence information indicating that the communication device has connected to the communication session, and receiving from the second communication device a request from the contact to connect to the communication session.

12 Claims, 14 Drawing Sheets

(56) References Cited

U.S. PATENT DOCUMENTS

| | | | |
|---|---|---|---|
| 8,516,052 B2* | 8/2013 | Fu et al. | 709/205 |
| 8,577,886 B2* | 11/2013 | Markus et al. | 707/738 |
| 9,024,993 B2* | 5/2015 | Hession et al. | 348/14.01 |
| 2003/0009767 A1* | 1/2003 | Narita | H04L 12/1818 725/97 |
| 2007/0067387 A1* | 3/2007 | Jain et al. | 709/204 |
| 2008/0229244 A1* | 9/2008 | Markus | G06F 17/30867 715/811 |
| 2008/0270916 A1 | 10/2008 | Chen et al. | |
| 2009/0037826 A1* | 2/2009 | Bennetts | 715/753 |
| 2009/0132660 A1 | 5/2009 | Wyatt | |
| 2010/0149307 A1* | 6/2010 | Iyer et al. | 348/14.09 |
| 2010/0185770 A1 | 7/2010 | Hehmeyer et al. | |
| 2010/0223335 A1* | 9/2010 | Fu | H04L 12/1818 709/205 |
| 2011/0153735 A1* | 6/2011 | Eisenberg | 709/203 |
| 2011/0300841 A1* | 12/2011 | Archambault et al. | 455/416 |
| 2011/0302160 A1* | 12/2011 | Juan | G06Q 10/10 707/723 |
| 2012/0158848 A1* | 6/2012 | Hession | H04L 12/1822 709/204 |
| 2012/0179637 A1* | 7/2012 | Juan | G06Q 10/10 706/45 |
| 2013/0041953 A1* | 2/2013 | Renner et al. | 709/204 |

OTHER PUBLICATIONS

"Microsoft Lync Server, Getting Started with Microsoft Lync Server 2010," Microsoft Lync Server 2010, Mar. 2012, 102 pages.

"Avaya One-X Mobile Preferred for IP Office User Guide," Avaya, 01.02, Jan. 2012, 62 pages.

"Skype Connect—User Guide," Skype, Version 4.0, 2011, 50 pages.

"Huawei eSpace Unified Communications Solution," Huawei Techchnologies Co., Ltd., 2012, 24 pages.

Foreign Communication From a Counterpart Application, PCT Application No. PCT/CN2013/085528, International Search Report dated Jan. 23, 2014, 6 pages.

Foreign Communication From a Counterpart Application, PCT Application No. PCT/CN2013/085528, Written Opinion dated Jan. 23, 2014, 5 pages.

Foreign Communication From a Counterpart Application, European Application No. 13846469.8, Extended European Search Report dated Aug. 25, 2015, 8 pages.

\* cited by examiner

600

User B see's User A ( contact #2 ) on an audio conference. A context aware match is made based on the keyword and an invitation is shown.

600

User A can remove user B if the context or necessity of B is not needed. User A is, in a way, the session owner.

Current Use Case: Meeting organizer has to inform participants that they have to attend a meeting via related invite, email or IM session.

New Use Case: Meeting organizer's presence has all the information and also provides alerts to 'trusted list' contacts to join meetings as needed.

SHARED RESOURCE AND SESSION MODEL USING PRESENCE DATA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Presence and instant messaging (IM) clients are software applications that provide presence information sharing and IM services. The presence and IM clients may be installed on user devices (e.g., desktop or laptop computers, smartphones, or other mobile devices) or accessed using website browsers (e.g., via the Internet or other data access networks). The installed clients may be preinstalled on user devices, provided by service providers, or provided by third parties (e.g., software developers). Examples of presence and IM clients and applications include MICROSOFT LYNC, AVAYA ONE-X MOBILE, CISCO JABBER, SKYPE, and HUAWEI ESPACE.

IM is a form of communication, e.g., over the Internet, that offers an instantaneous transmission of text-based messages from sender to receiver. In "push" mode between two or more people using personal computers or other devices, along with shared clients, IM offers real-time direct written language-based online chat. The user's text is conveyed over a network, such as the Internet. IM may address point-to-point communications as well as multicast communications from one sender to many receivers. More advanced IM allows enhanced modes of communication, such as live voice or video calling, video chat, and inclusion of hyperlinks to media.

Presence information conveys the ability and/or willingness of a communication partner or contact to communicate. A user client (e.g., a software application) may publish a presence state of the user to indicate the user's current communication status. This published state informs others that wish to contact the user of his availability and willingness to communicate. Presence information can be displayed as an indicator icon on IM clients, typically from a choice of graphic symbols with easy-to-convey meanings and a list of corresponding text descriptions of each of the states. Common states on the user's availability are "free for chat", "busy", "away", "do not disturb", and "out to lunch". Such states exist in many variations across different IM clients. Current standards support a choice of additional presence attributes that can be used for presence information, such as user mood, location, or free text status.

Current presence and IM clients show the current status of the contacts and allow users to communicate with each other via IM, for example via texting or chatting. However, these presence and IM clients do not support features to allow a user to request to join a contact involved in a current communication session (e.g., for a discussion, meeting, or presentation) or share communication session related information that may be of interest or benefit to the user.

SUMMARY

In one embodiment, the disclosure includes a method implemented in a communication device, the method comprising receiving a context preference for a contact, storing the context preference, connecting to a communication session via the communication device, transmitting, for display at a second communication device, context information based on the context preference and presence information indicating that the communication device has connected to the communication session, and receiving from the second communication device a request from the contact to connect to the communication session.

In another embodiment, the disclosure includes a communication device comprising a processor, a memory, a presence and instant messaging (IM) client stored in the memory that, when executed by the processor receives a context preference for a contact, stores the context preference to the memory, connects to a communication session, transmits context information to a second communication device, wherein the context information is based on the context preference and presence information indicating that the communication device has connected to the communication session, and receives from the second communication device a request from the contact to connect to the communication session.

In yet another embodiment, the disclosure includes a method implemented in a communication device, the method comprising receiving presence information and context information about a communication session involving a second communication device, displaying on a display of the communication device the presence information and the context information, and receiving a user input in response to the displaying of the presence and context information, transmitting, in response to the user input, a request to the second communication device to join the communication session in response to the displayed presence information and context information.

In yet another embodiment, the disclosure includes a database server comprising a memory, a processor coupled to the memory, the processor configured to receive a context preference about a communication session involving a contact, store the context preference to the memory, receive context information regarding the communication session from a communication device, request the context preference from the memory, and determine whether the context preference and the context information match and if so send a notification of the communication session and an option to join the communication session to a second communication device.

These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

Figure 1:
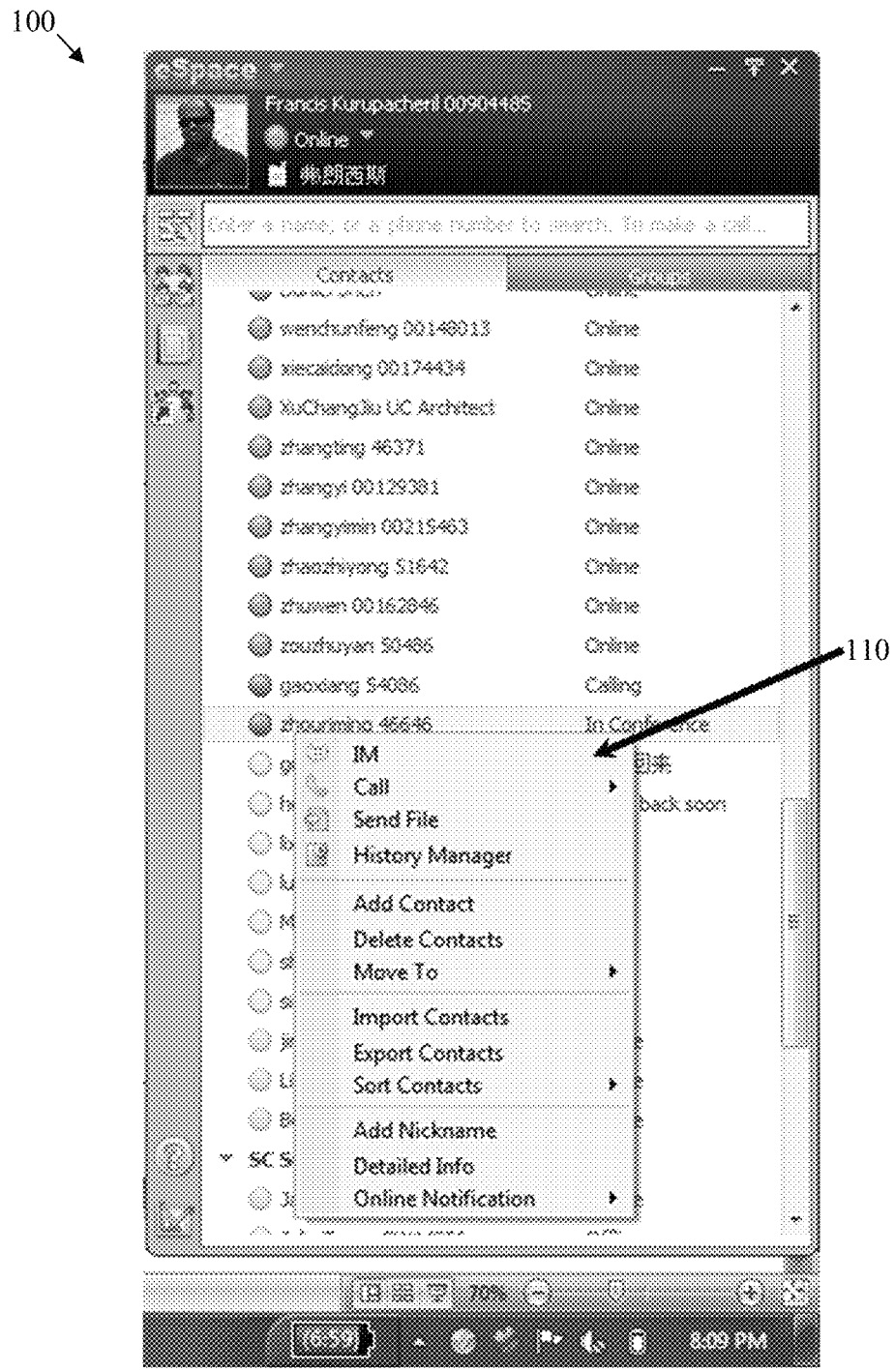
FIG. 1 is an illustration of a current application for a presence and IM client.
Figure 2:
FIG. 2 is an illustration of another current application for a presence and IM client.
Figure 3:
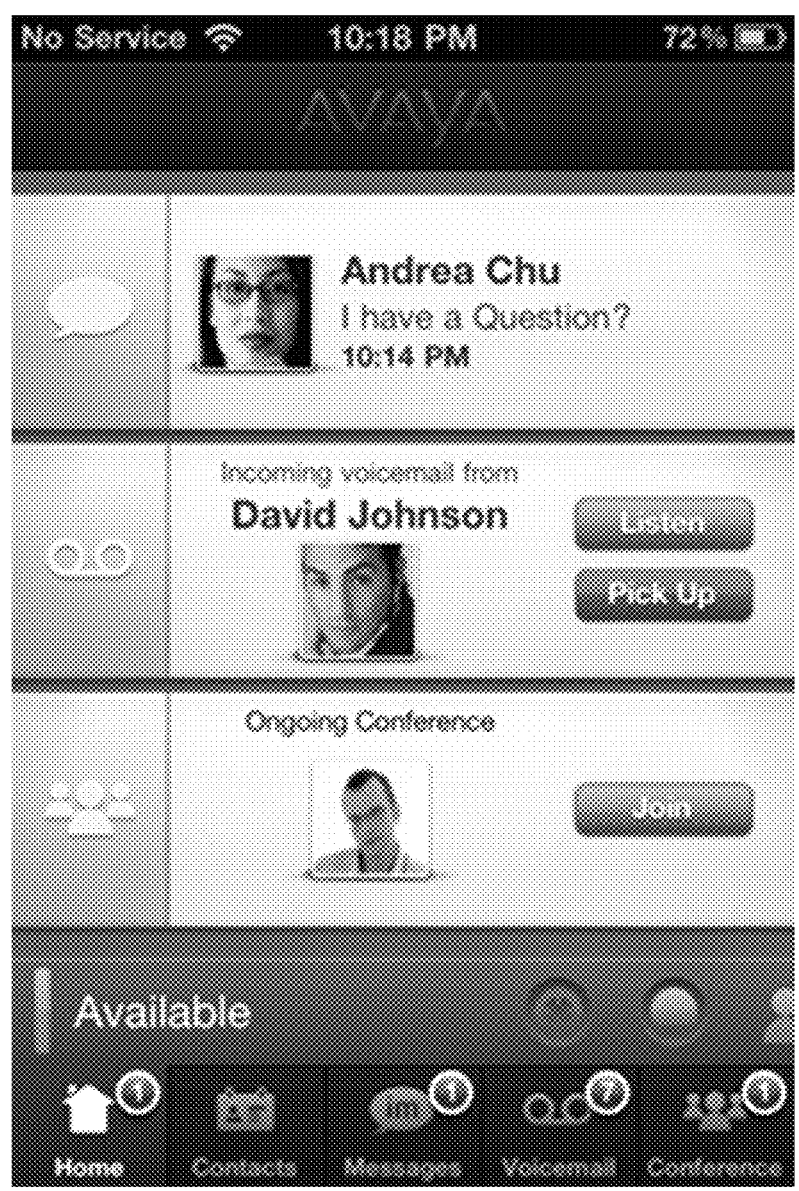
FIG. 3 is an illustration of another current application for a presence and IM client.
Figure 4:
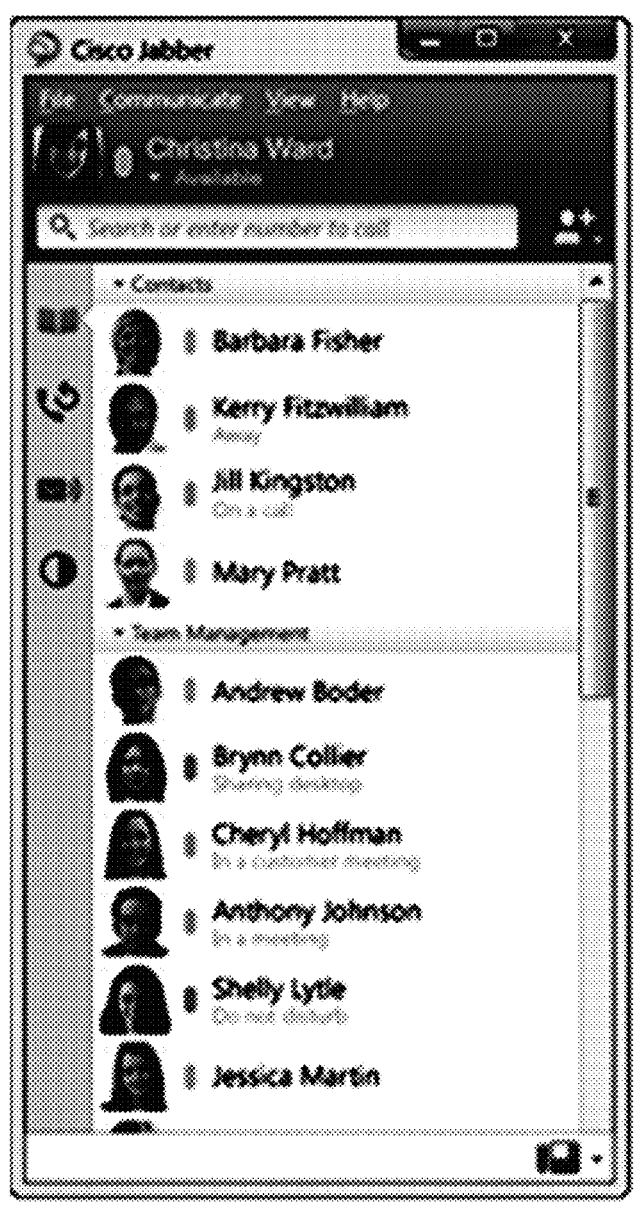
FIG. 4 is an illustration of another current application for a presence and IM client.
Figure 5:
FIG. 5 is an illustration of another current application for a presence and IM client.

FIG. 1 illustrates a currently used application 100 for a presence and IM client. The application 100 may be a software program developed and used by Huawei (e.g., between employees) and referred to as ESPACE. The application 100 may be installed or accessed on personal computers (e.g., in the work space) and used by users (e.g., employees) to communicate their current status (e.g., availability to communicate) to other users, which may be registered contacts of the user. The user may group his contacts in one or more different contact lists. The application 100 may also be used to exchange instant messages or other text based messages between the users. However, the application 100 may not provide the user other contact information related to communication sessions that may be of interest or benefit to the user, such as about topics or tasks discussed during communication sessions. Further, the application 100 may not allow the user to join, or request to join, a contact in an ongoing communication session, such as a conference call that the contact may be part of.

As shown in FIG. 1, a user (Francis Kurupacheril) may log in and use the application 100 (on a user device such as a desktop computer) to view one or more list of contacts and their corresponding statuses (e.g., online, in conference, etc.). The user information, including the user name, identifier (ID), and status may be displayed above the contact list(s). The user may also have the option to send messages to his contacts. The application 100 may show a contact (zhouriming) to be in a conference without providing more information about the conference, such as about the topic(s) discussed and/or resources used in the conference. The contact information, including the contact name, ID, and status may be shown as an entry in the list.

The application 100 may provide the user a plurality of options associated with the contact. For example, the user may select a contact and trigger a menu 110 of options (e.g., using a right-click on a computer mouse), which may include options for IM, calling, and sending a file to the contact. However, the application 100 does not provide the user an option to join the conference, or to send a request to do so, while the conference is taking place. Thus, the user may not be capable of joining the conference using the application 100, e.g., if the user has not been invited by the contact to join this conference or has not received an invitation sent previously by the contact.

FIGS. 2-5 illustrate other applications 200, 300, 400, and 500 for presence and IM clients, which may have similar features to the application 100. The application 200 is the MICROSOFT LYNC application, the application 300 is the AVAYA ONE-X MOBILE application, the application 400 is the CISCO JABBER application, and the application 500 is the SKYPE application, which are all are commercially available and widely used. The applications 200-500 may include presence and IM clients that have the features described above for the application 100, i.e., displaying one or more lists of contacts and their current statuses and exchanging messages (instant messages) between the users. Some of the applications 200-500 may have additional features. For instance, the SKYPE application includes options to communicate via video calls, and the Avaya application allows a user to join a conference if the user has been sent an invitation (from a contact) to do so. However, the applications 200-500 and other currently used applications for presence and IM clients that have similar features, including the application 100, do not allow users to join conferences or other forms of communication sessions that other contacts are part of without receiving an invitation. Further, these applications do not provide communication session information that may be of interest or benefit to users to decide whether to join communication sessions associated with such information.

Disclosed herein are systems, methods, and apparatuses for providing means to share context information using a presence and IM client application. The context information may be communication session related information, such as in the form of keywords or brief descriptions about communication sessions, associated tasks, and/or discussed topics or goals. The communication session related information may also comprise communication session resources. The communication session resources may comprise any resources that may be used or accessed using the communication session, such as document files, power point slides, contact phone numbers, access codes, or other resource related information. The context information and other communication session related information may be displayed or made available to a user with the status of contacts in the user's contact list(s).

Additionally, the user may have the capability to join or send (to a contact) a request to join an ongoing communication session (e.g., a conference call) even if the user has not received an invitation to do so. The user may decide to join an ongoing communication session based on displayed context information associated with the communication session, which may be of interest or benefit to the user. The presence and IM client application may allow users to indicate or select context information of interest or benefit to users, and send users notices about scheduled or ongoing communication sessions that are associated with the indicated context information. These provided features may simplify user communications and improve user convenience to join communication sessions. The features may also save user time to search for or find communication sessions of interest or benefit to the users.

In an embodiment, a presence and IM client that may be used by a user may be configured to support the added features above. The presence and IM client may correspond to or may be part of an application that comprises similar features as the applications 100-500 and that may be installed and/or accessed by the user on a computer system, e.g., a desktop or a laptop computer or other suitable communication devices. Additionally, the application may be configured to inform users about contacts involved in current communication sessions, such as audio or video conferences or group chat discussions, which may be of interest or benefit to the users and/or may need the user's participation. The presence and IM client or application may also allow users to request to join such ongoing or current communication session. Allowing the users to join communication sessions of interest or benefit to the users and/or that need the user's participation may positively impact workplace efficiency, promote collaboration, and improve information exchange.

The user may identify sessions that may be of interest or benefit or that the user may need to participate in based on context information that may be displayed, for instance with the status of a contact that is in a current session. The term context information herein includes any information that may be entered or used to identify a topic, task, activity, or description of a communication session. For instance, the context information may include one or more words (e.g., keywords) or text that describes a topic, a task, an activity, a project, or a goal of the communication session. The context information associated with a current communication session may be entered by the user and/or the contact and displayed along with contact's current status (e.g., in conference or session). In some embodiments, the context information may be previously selected or entered by the user and matched to the context information entered by the contact that participates in the session.

In addition to displaying the context information to the user, the presence and IM client may also allow the user to access shared resources for the session, such as document files (e.g., MICROSOFT WORD document files and/or ADOBE Portable Document Format (PDF) files), presentation slides (e.g., MICROSOFT POWERPOINT files), access codes and/or phone numbers to participate in the session, database access, access IDs, online links, bandwidth, storage, memory, and/or other resources that may be used in the session.

The presence and IM client may allow the users to be part of the ongoing or current sessions without receiving invitations, e.g., from any party or user contact that is part of the communication session. Further, the users may be notified of the sessions automatically without receiving an invitation from a party or contact that participates in the sessions. This also may enable the user to join the sessions without passing or using links (e.g., uniform resource locators (URLs)) or other session information via IM, texts, or emails to the users. When a user sees a communication session (e.g., an ongoing session) that the user wishes to join, the user may send a request to one or more parties or contacts in the session to join the session. The user may then join the session and participate in the discussion, e.g., after his request to join is accepted.

Figure 6A:
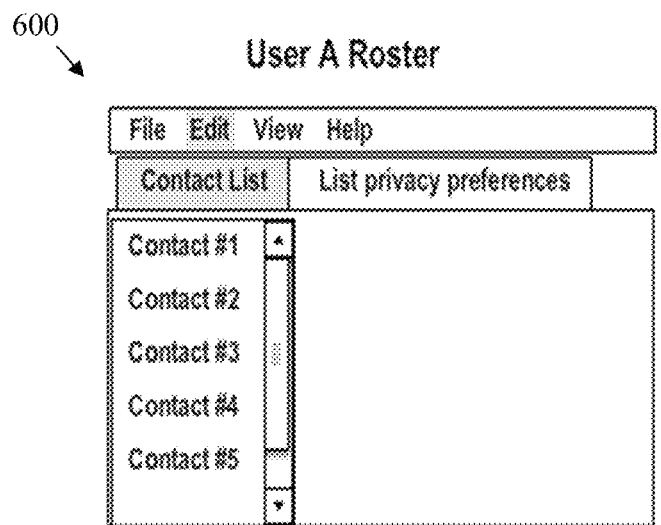
FIGS. 6A-6D illustrate a presence and IM client that supports joining users to current communications sessions and sharing related context information according to an embodiment of the disclosure.

FIGS. 6A-6D illustrate aspects of another embodiment of a presence and IM client 600 that supports joining users to current communication sessions and sharing related context information. The presence and IM client 600 may allow a user to set up preferences to determine which communication sessions to send notifications for, such as based on associated context information, to other users or contacts. A user (User A) may set up his preferences for sending notices for communication sessions that the user may be part of to other users or contacts. In FIG. 6A, a user may display a roster or a list of contacts (e.g., Contact#1, . . . , Contact#5), which may also be users of instantiations of the presence and IM client 600 on other corresponding systems or devices. For instance, the user may access the list of contacts by selecting an entry (Edit) in a top menu, and then selecting another entry (Contact List) in a submenu.

Figure 6B:
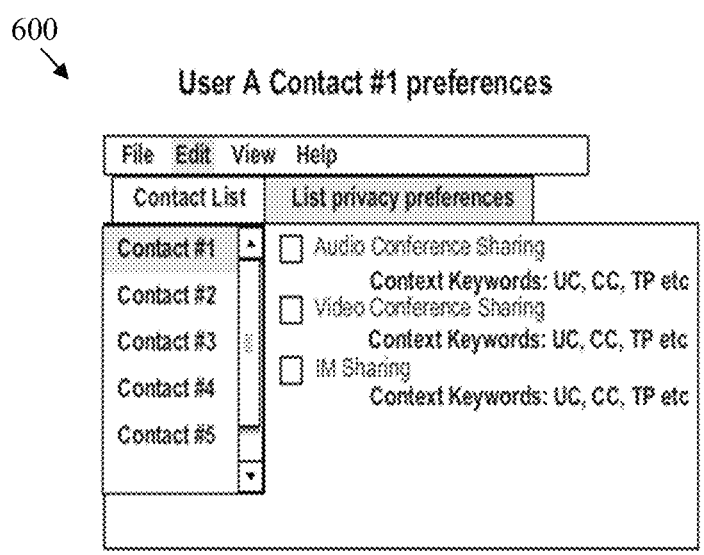

In FIG. 6B, the user may select a contact (Contact#1) in the list of contacts and select another entry (List privacy preferences) in the submenu to set up one or more preferences (e.g., context preferences) for that contact. The preferences may determine which communication sessions to send notifications for to the selected contact when the user is part of the sessions. For example, the list of preferences may comprise an option for selecting audio conference sharing associated with one or more context keywords (strategy, hiring, financials, bonus, etc.), which may be entered by the user. Similarly, the list of preferences may also comprise options for selecting video conference sharing and IM sharing associated with the same and/or different context keywords. The user, i.e., User A may select the option for audio conference sharing with Contact#1, which may be another user (on another device), i.e., User B.

Figure 6C:
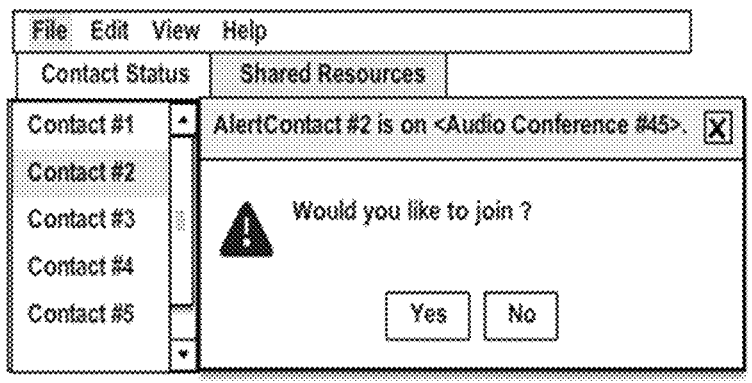

In FIG. 6C, User B (i.e., Contact#1 of User A) may be notified via an instantiation of the presence and IM client 600 on his device when Contact#2 of User B (i.e., User A) joins an audio conference that may be associated with the one or more indicated keywords (in the list of preferences of User A). The presence and IM client 600 may display for User B an alert message which notifies User B that Contact#2 (i.e., User A) has joined an audio conference session. The alert message may be shown to User B if the context keywords or information associated with the session match context keywords or information that may be previously indicated or selected by User B to receive such alerts or notifications. The alert message may also provide User B the option to join the session or decline. If User B decides to join the session, e.g., based on the context keyword(s) of the session that may be of interest to User B, then a join request may be sent to User A.

Figure 6D:
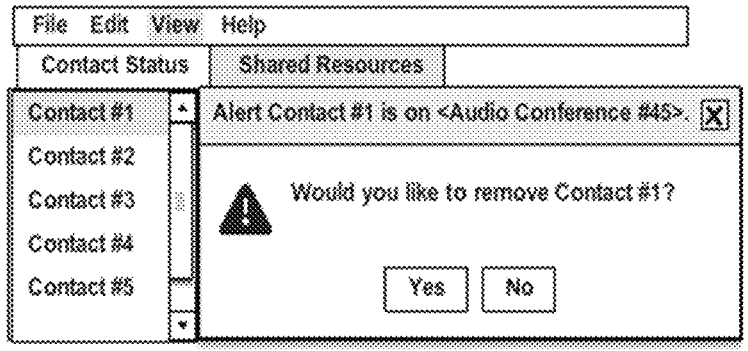

In FIG. 6D, the presence and IM client 600 may display for User A an alert message which notifies User A that Contact#1 (i.e., User B) has requested to join the audio conference session. The alert message may also provide User A the option to accept or decline the join request from Contact#1. If User A decides to accept the join request from Contact#1, then Contact#1 (i.e., User B) may join the audio conference session of User A. Otherwise, User B may not be allowed to join the session.

Figure 7:
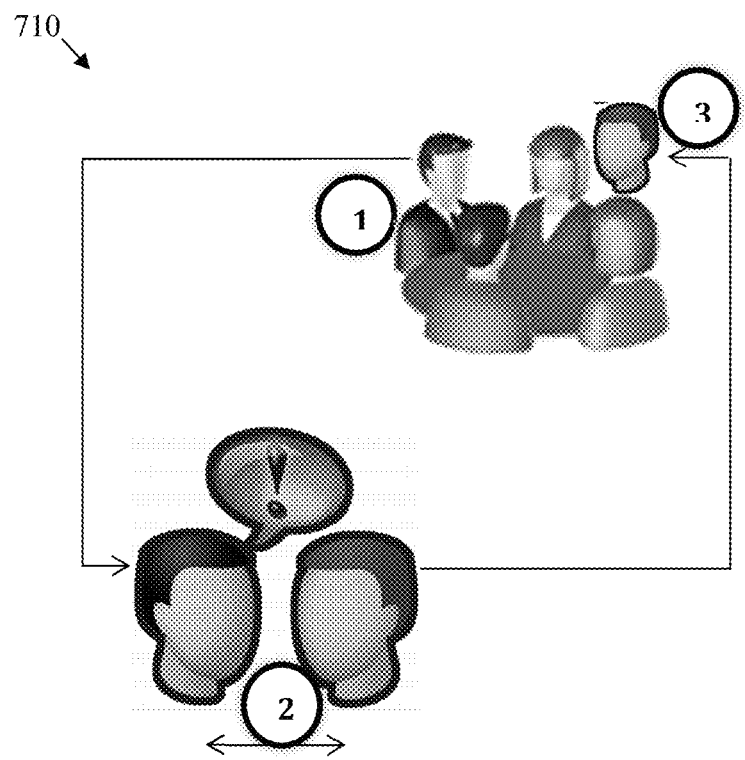
FIG. 7 illustrates a conventional scheme for joining communication sessions.

FIG. 7 illustrates a conventional scheme 710 for joining communication sessions. According to the typical scheme 710, at a first step, a meeting organizer may inform one or more participants to attend a communication session, such as an audio or video conference. At a second step, the participants (e.g., including the organizer) may exchange invitations to the session via IM or email. The IM or email invitations may be sent via typical presence and IM clients, such as any of the applications 100-500 or similar clients. The invitations may be sent prior to or during the session. At a third step, the invitees may accept the invitations and hence may be allowed to join the session.

Figure 8:
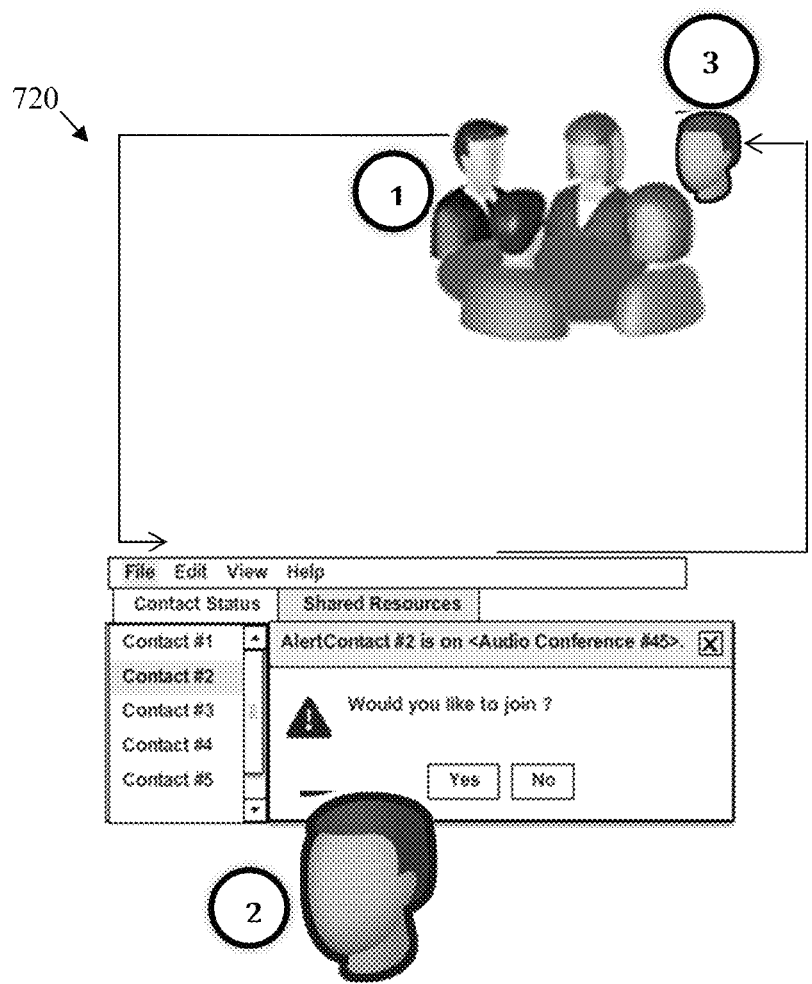
FIG. 8 illustrates a presence and IM client scheme that supports joining users to current communications sessions.

FIG. 8 illustrates a presence and IM client scheme 720 that supports joining users to current communications sessions as described above. According to the presence and IM client scheme 720, the presence of at least one party in a communication session may alert the user of a presence and IM client of the ongoing session. The party present in the session may be a contact of the user, and the current status of the contact (e.g., in conference) may be displayed by the presence and IM client to the user. Further, the presence information may be combined with context information related to the communication session to alert the user of the ongoing session. For instance, the user may be alerted of the communication session if the communication session is associated with context keywords and/or other information that match context information indicated or selected by the user. As described above, the user may indicate or select context information for communication sessions that may be of interest or benefit to the user or that may need the user participation.

According to the presence and IM client scheme 720, at a first step, a meeting organizer may inform one or more participants to attend a communication session, such as an audio or video conference. At a second step, a user of the presence and IM client may be informed of the session when one or more contacts of the user attend the session and update their status accordingly. At a third step, the user may send a request to join the session to a contact that participates in the session (e.g., a video or voice conference or an IM session) and receive approval to join.

Figure 9:
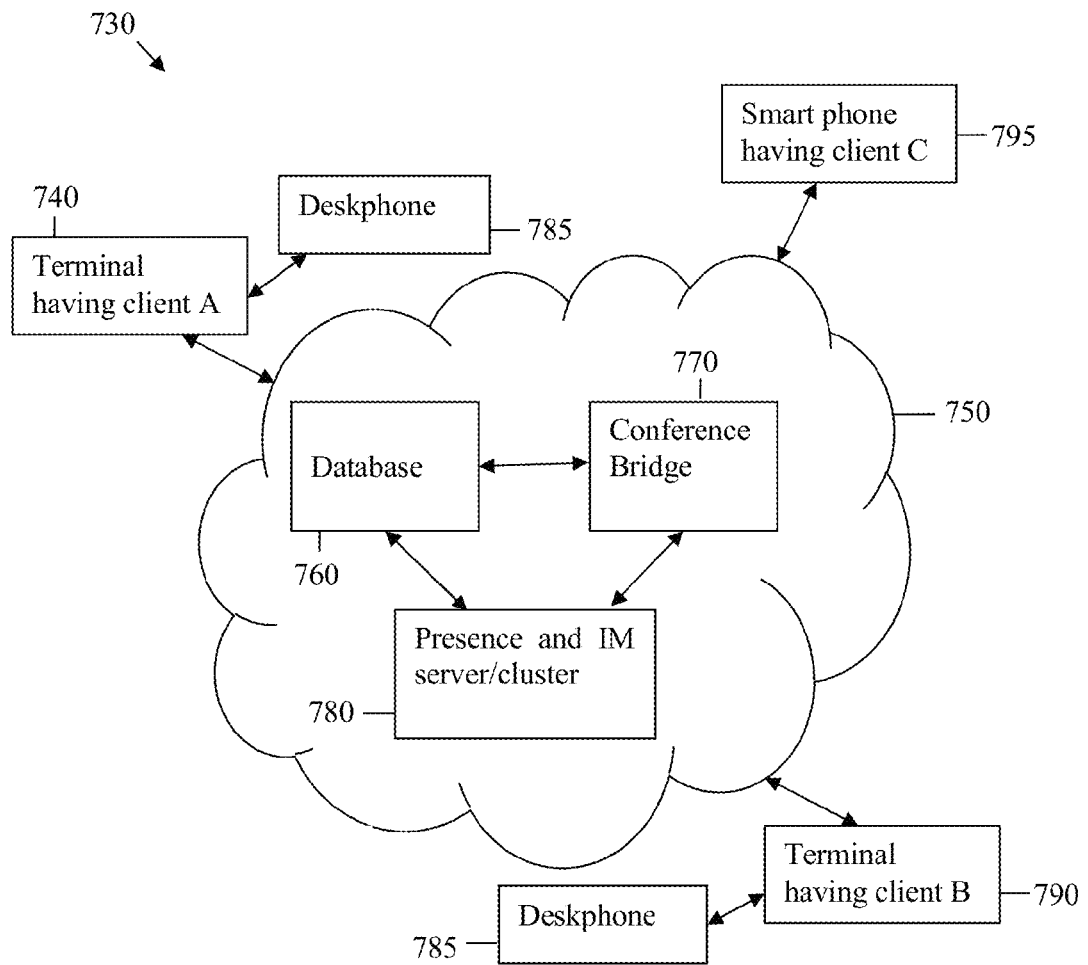
FIG. 9 is a schematic diagram of a presence and IM system that supports joining users to current communications sessions according to an embodiment of the disclosure.

FIG. 9 is a schematic diagram of a presence and IM system 730 that supports joining users to current communications sessions according to an embodiment of the disclosure. The presence and IM system 730 comprises database 760 (or database server), conference bridge 770, and presence and IM server or server cluster 780 (hereafter referred to as a server cluster) connected as shown in FIG. 9. The database 760, conference bridge 770, and presence and IM server cluster 780 may be connected via a network 750, which may be any sort of local area or wide area network, such as an Internet Protocol (IP) network. The database 760 may act as a central repository to store information about contact lists and client preferences regarding the sharing of presence information with contacts in the contact lists. The conference bridge 770 may be used to establish conference video and/or audio-only calls among users of the system 730, and the presence and IM server cluster 780 distributes presence information among user terminals and allows IM sessions between users of user terminals. A presence and IM system comprises one or more terminals or other unified communication devices having clients. In the example in FIG. 9, the presence and IM system comprises terminals 740 and 790 having clients A and B, respectively, and smart phone 795 having client C. A presence and IM system may also comprise one or more deskphones. In the example in FIG. 9, the presence and IM system comprises deskphones 785. Each deskphone 785 may be coupled to a terminal (via, e.g., tethering) as shown in FIG. 9 and to a presence and IM client in the terminal. Thus, a communication session using a deskphone 785 may be detected by a presence and IM client. In general, there may be any number of communication devices connected to the presence and IM system. Also, a single user may be logged into more than one communication device at a given time. For example, a user may be logged into a presence and IM system via a client on a terminal at work while also being logged into the presence and IM system via a second client running on a smart phone or tablet computer.

The operation of presence and IM system 730 is illustrated via an example. The example is similar to the one illustrated in FIG. 6A-6D. Suppose user A is using client A, which may be an instantiation of a presence and IM client, at terminal 740. User A has a list of contacts. User A uses client A to select contact #1 and decides that contact #1 belongs to a trusted list of contacts that can see specific context-related meetings. In particular, user A decides that contact #1 can be allowed to see conference attendance information of user A. This information may be stored in a central database, such as database 760. User A uses client A to update information related to contact #1, and this information is passed from terminal 740 to presence and IM cluster 780 for distribution to other clients and to database 760, where this information is stored. At a later time, user A begins a conference call via conference bridge 770. The presence and IM server cluster 780 receives a message from either terminal 740 or conference bridge 770 that user A is on a conference call. The presence and IM server cluster 780 retrieves user A's preferences from database 760, which indicates that client B (used by contact #1) at terminal 790 should be sent a presence update indicating that user A is on a conference call. Client B receives the message and provides an indication to user B, via, for example, a video display. User B can join the conference if she decides to do so. In case user B decides to join the conference, user A may still hold control over the extent to which user B can participate.

The presence and IM system 730 represents an example centralized architecture in which preference and context information are stored in a centralized database 760. Alternatively, a presence and IM system may be implemented as a decentralized, or peer-to-peer, architecture in which each communication device stores its own presence and context preferences. Even in the centralized architecture, presence and context preferences may be stored centrally (e.g., in a database server) and presence and context preferences for a user's contacts may be retrieved from a centralized repository (e.g., a database server) and loaded into the local memory of the user's communication device upon startup, reboot, or refresh of the communication device.

Figure 10A:
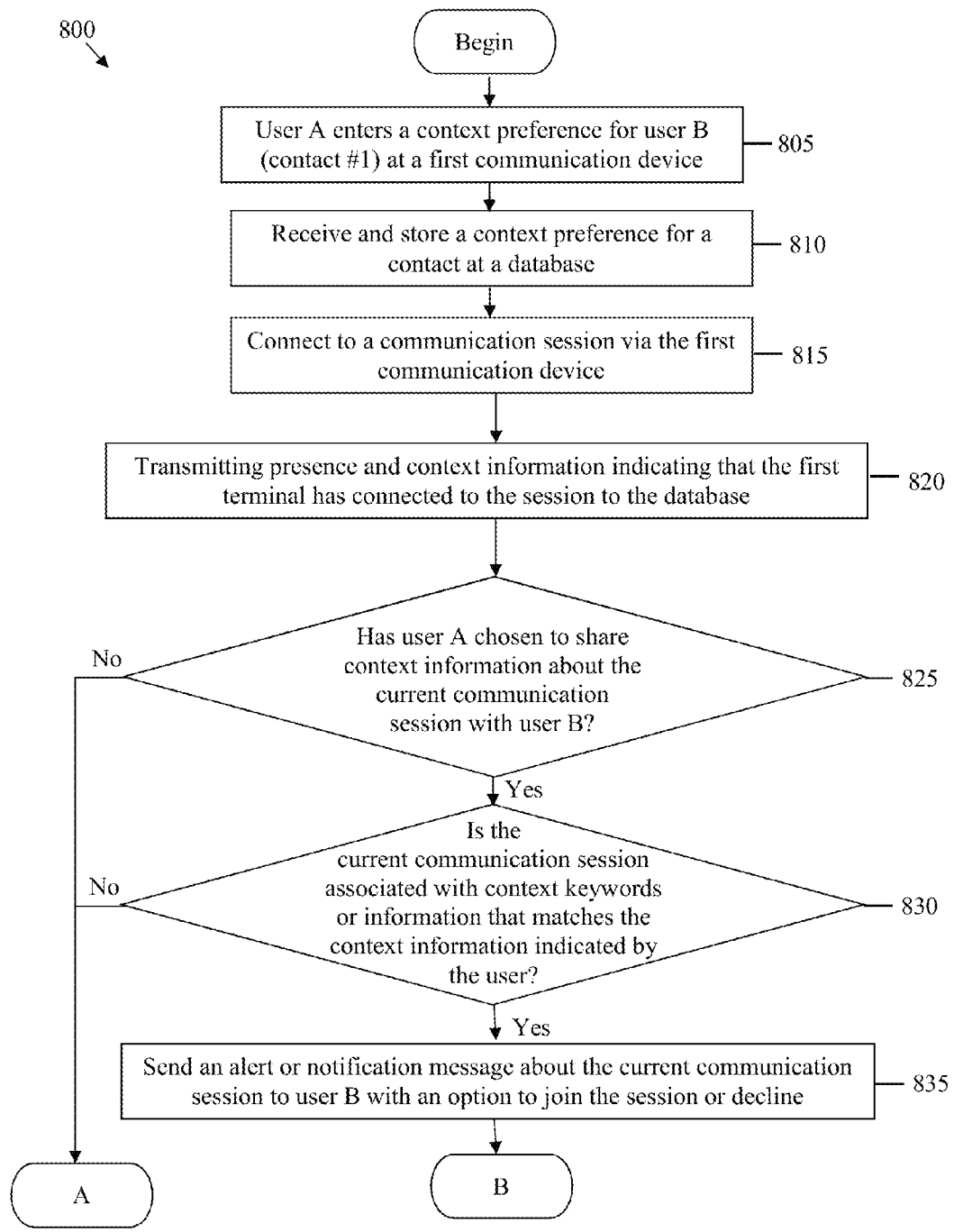
FIGS. 10A and 10B presents a flowchart of an embodiment of a method for joining users to communication sessions and sharing related context and presence information.
Figure 10B:
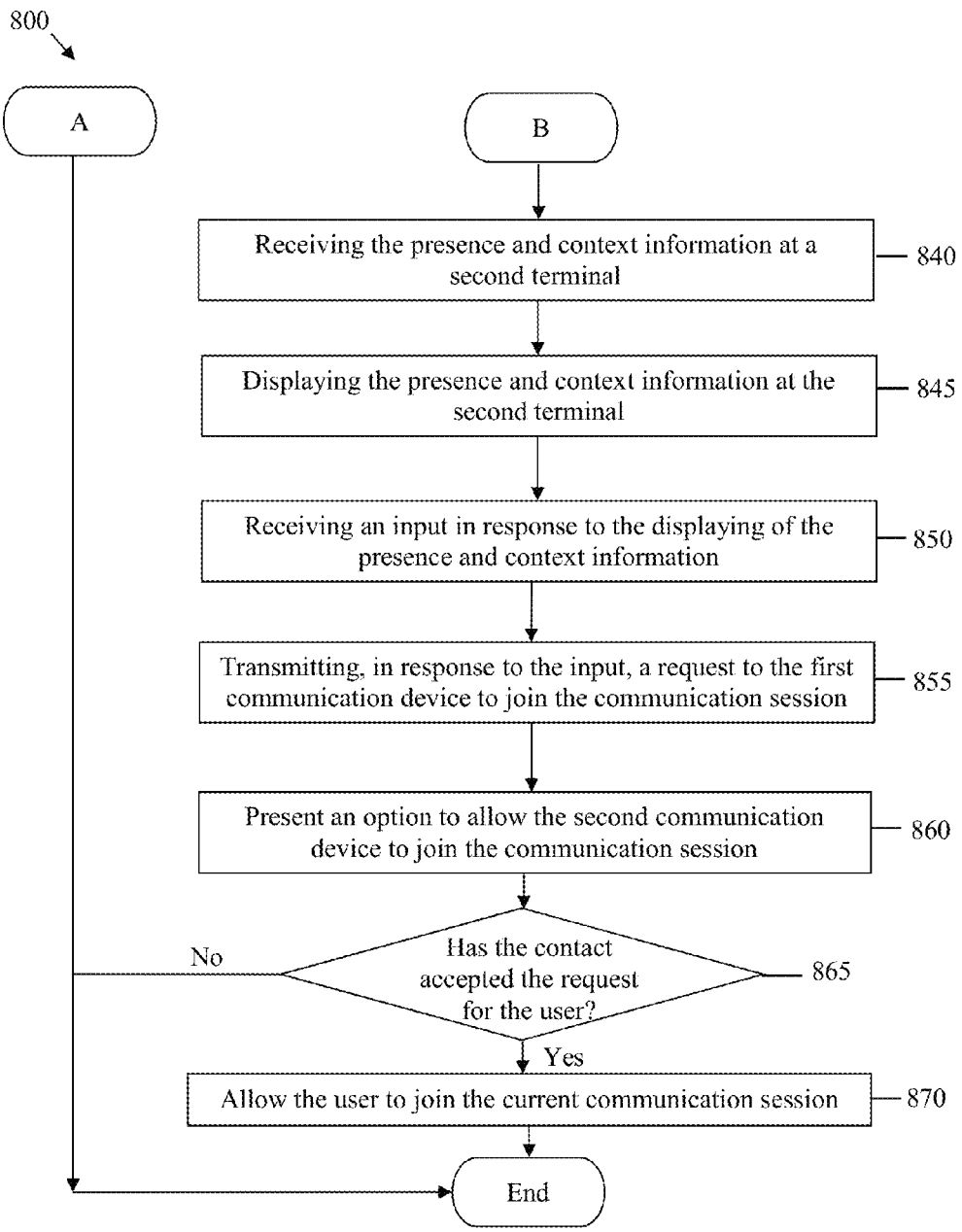

FIGS. 10A and 10B illustrate a flowchart of an embodiment of a method 800 for joining users to communication sessions and sharing related presence and context information. The method may be implemented using a presence and IM system, such as presence and IM system 730. The presence and IM system may comprise a plurality of communication devices, such as a desktop computer, a laptop computer, a smartphone, a tablet computer, or other suitable devices, each of which hosts a presence and IM client application that is hosted on a computer or the communication device. The terminals 740 and 790 and smart phone 795 in FIG. 9 are examples.

At step 805, a user (user A) may enter a context preference for a contact (user B or contact #1) into a first communication device. The user may set a list of context keywords and/or other session related information, e.g., topic reference numbers, cases numbers, documents, etc. that may be used in association with communications sessions (e.g., conferences) between multiple parties. The context preference may be transmitted to a database for storage. At step 810, the context preference may be received and stored at a database. At step 815, user A may connect to a communication session via the first communication device. The communication session may be, for example, an audio or video conference. At step 820, presence information conveying the presence of the user in the communication session (e.g., "on call") and context information about the communication session indicating that the first communication device has connected to the communication session. The information may be transmitted to a database. At decision block 825, a context-aware comparison may be performed. More specifically, at decision block 825, a determination may be made whether user A has chosen to share context information about the current session with user B. If not, the flowchart ends. If user A has chosen to share context information, the flowchart proceeds to decision block 830. In decision block 830, a context-aware comparison is performed. That is, a decision is made whether a context description of the communication session matches context keywords indicated by user A with respect to user B. The comparison may be made in a database server, such as database server 760, or, if context information is saved locally, the comparison may be made in a communication device, such as a terminal 740 or smart phone 795 as discussed earlier. If a match is not made, the flowchart ends. If a match is made, the flowchart proceeds to step 835.

In step 835, an alert or notification message about the communication session may be sent to user B with an option to join the communication session or to decline to join. The device that performs the comparison in decision block 830 may be the same device that sends the alert or notification message. In step 840, the presence and context information about user A and the communication session are received at a second communication device, e.g., a terminal used by user B. In step 845, the second communication device displays the presence and context information. In step 850, an input is received, e.g., at the second communication device, in response to the displaying of the presence and context information. The input may be received from user B after user B reads the presence and context information. Further, the input may be to select an option to join the communication session. In step 855, a request to join the communication session may be transmitted to the first communication device. The request may be transmitted from the second communication device in response to the input from user B. In step 860, an option may be presented to allow the second communication device to join the communication session. The option may be presented at the first communication device. Further, the presentation may be in the form of displaying the option on the first communication device. Next in decision block 865, a determination may be made whether the contact (e.g., user B) accepted the request from user A. If so, the flowchart proceeds to step 870, in which the user (user B) is allowed to join the communication session. If not, the flowchart ends.

Figure 11:
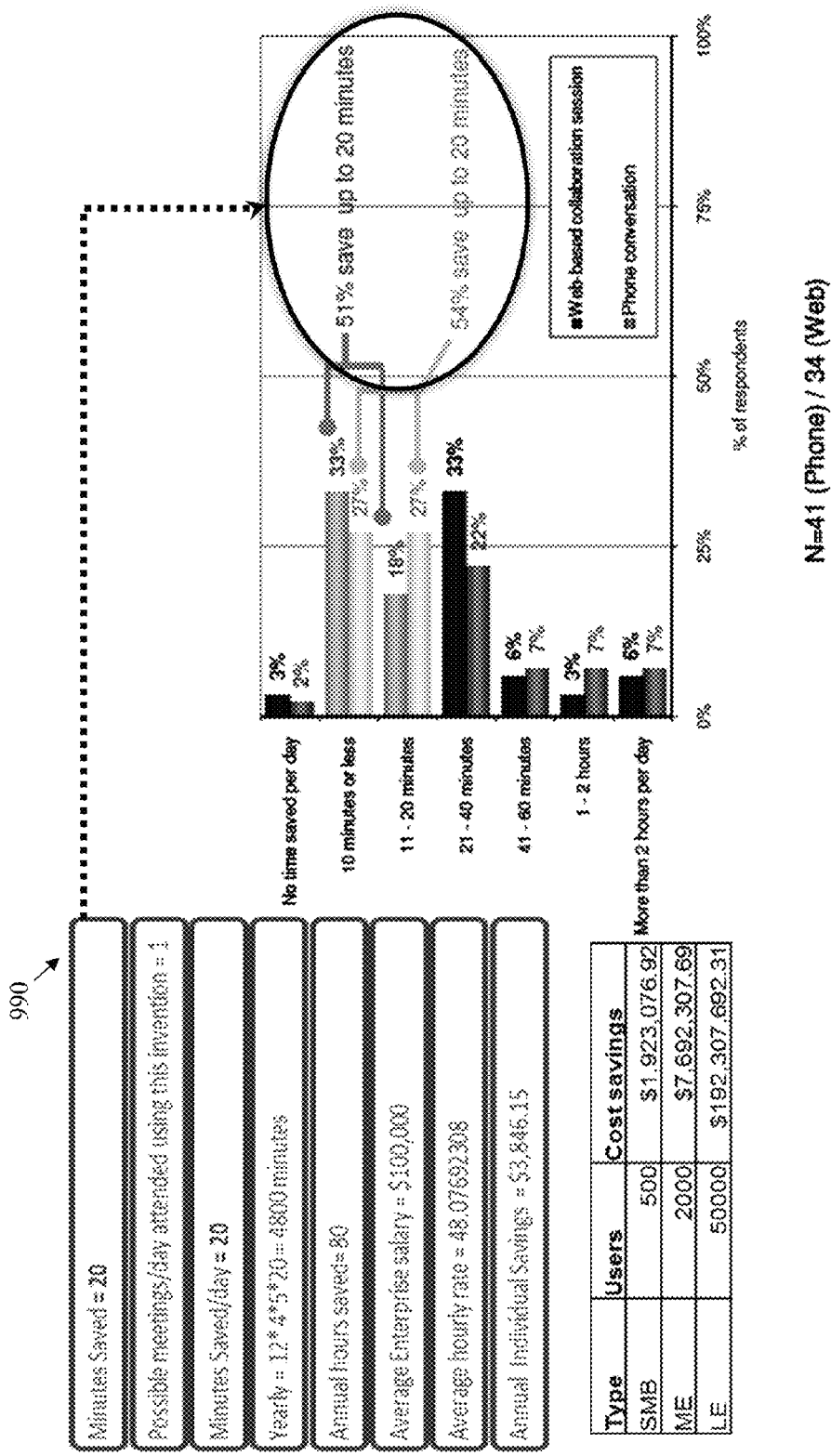
FIG. 11 is an illustration of a study of cost savings using a presence and IM client that supports joining users to current communications sessions and sharing related context information according to an embodiment of the disclosure.

FIG. 11 illustrates a study 990 of cost savings using a presence and IM client that supports joining users to current communications sessions and sharing related context information as described above. The study 990 estimates how much time a typical employee may save per day at an organization by being able to progress an IM session into a live phone conversation by a single click of a mouse (using a presence and IM client application as above). The study 990 also estimates how much time a typical employee may save per day at an organization by being able to initiate a web-based collaboration session during an IM session or a live phone conversation by a single click. The study 990 includes a plurality of assumptions, including the assumption of at least 50% uptake across different kinds of enterprises given about $3,846/user annual productivity savings. The study 990 also assumes a value of about $1/seat given the new features of the disclosure to be an addition built on presence data. The study 990 considers different organization sizes, including small business (SMB), medium enterprises (ME), and large enterprises (LE). As shown in FIG. 11, the results of the study 990 predict about 35 million seats for unified communication (UC) and presence solutions worldwide. Thus, the total value of new features of the disclosure may be equal to about $1/seat×50%×35 million seats=$17.5 million. In return, the estimated cost savings are about 1.9 million for SMB, about 7.6 million for ME, and about 192.3 million for LE.

Figure 12:
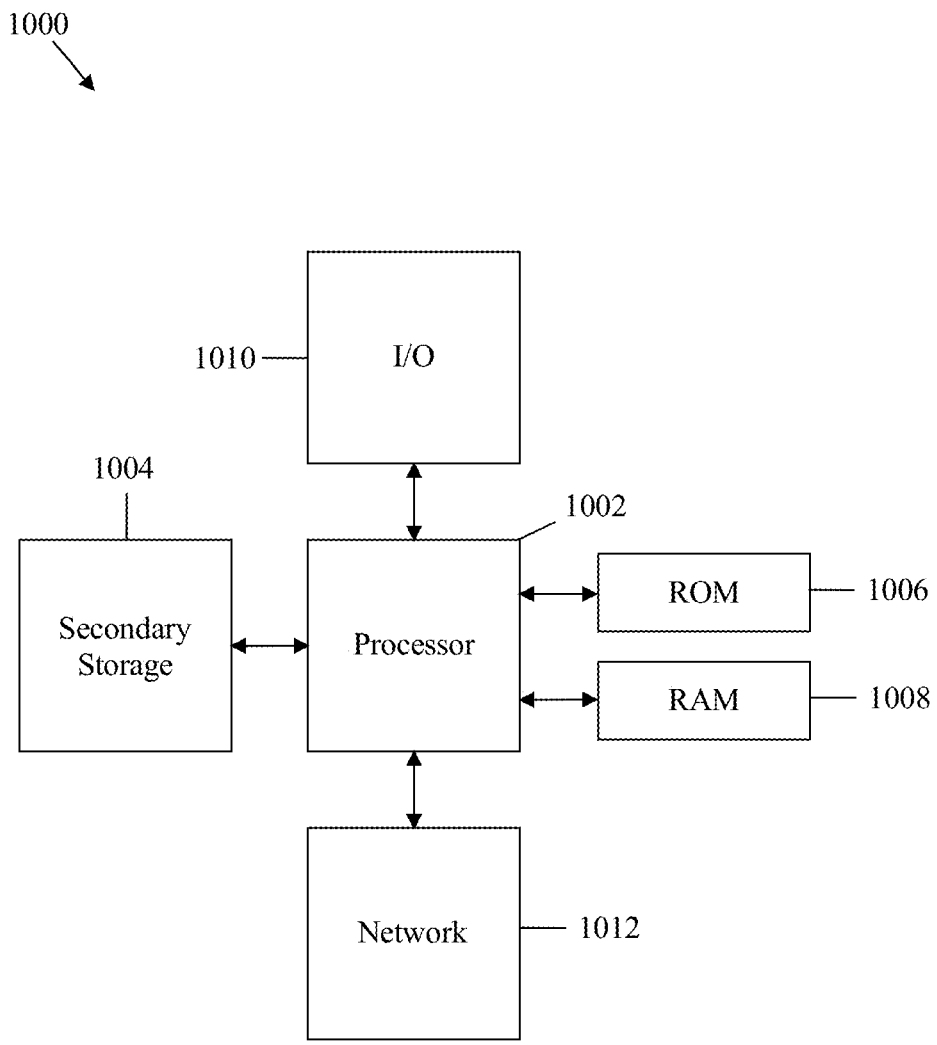
FIG. 12 is a schematic diagram of an embodiment of a general-purpose computer or network system.

The presence and IM client application and associated methods and schemes described above may be implemented on any general-purpose communication device, such as a computer or mobile communication device with sufficient processing power, memory resources, and network throughput capability to handle the necessary workload placed upon it. FIG. 12 illustrates a typical, general-purpose communication device 1000 suitable for implementing one or more embodiments of the features, applications, schemes, and methods disclosed herein. For example, the general-purpose communication device 1000 may comprise or be part of, located at or coupled to any of a desktop computer, a laptop computer, a tablet computer, a smartphone, a personal or mobile communication system, or similar devices. The general-purpose communication device 1000 includes a processor 1002 (which may be referred to as a central processor unit or CPU) that is in communication with memory devices including secondary storage 1004, read only memory (ROM) 1006, random access memory (RAM) 1008, input/output (I/O) devices 1010, and network connectivity devices 1012. The processor 1002 may be implemented as one or more CPU chips, cores (e.g., a multi-core processor), field-programmable gate arrays (FPGAs), application specific integrated circuits (ASICs), and/or digital signal processors (DSPs), and/or may be part of one or more ASICs. The processor 1002 may be configured to implement any of the presence and IM client based schemes and methods described above that support joining users to current communications sessions and sharing related context information. For instance, the processor 1002 may be configured (via hardware and/or software) to implement or support running the presence and IM client 600, the presence and IM client scheme 720, and the methods 800 and 900. The communication device 1000 may implement a device for communicating data and/or voice and/or video, such as terminal 740 or 790 coupled with a deskphone 785, and/or smart phone 795, and/or database server 760. A terminal coupled with a deskphone may be considered as a single communication device.

The secondary storage 1004 is typically comprised of one or more disk drives or erasable programmable ROM (EPROM) and is used for non-volatile storage of data. Secondary storage 1004 may be used to store programs that are loaded into RAM 1008 when such programs are selected for execution. The ROM 1006 is used to store instructions and perhaps data that are read during program execution. ROM 1006 is a non-volatile memory device that typically has a small memory capacity relative to the larger memory capacity of secondary storage 1004. The RAM 1008 is used to store volatile data and perhaps to store instructions. Access to both ROM 1006 and RAM 1008 is typically faster than to secondary storage 1004. If the communication device implements a database server, such as database server 760, the database of information may be stored in memory, such as in secondary storage 1004 or RAM 1008.

I/O devices 1010 may include a video monitor, liquid crystal display (LCD), touch screen display, or other type of video display for displaying information, such as presence and IM information as taught herein. I/O devices 1010 may also include one or more keyboards, mice, or track balls, or other well-known input devices. I/O devices 1010 may also include a deskphone (such as deskphones 785 in FIG. 9), an input microphone, a video camera (e.g., web cam), or other known device for capturing audio and/or video.

The network connectivity devices 1012 may serve as an output and/or input device of communication device 1000. The network connectivity devices 1012 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (Wi-MAX), and/or other air interface protocol radio transceiver cards, and other well-known network devices. These network connectivity devices 1012 may enable the processor 1002 to communicate with an Internet or one or more intranets.

It is understood that by programming and/or loading executable instructions onto the communication device 1000, at least one of the processor 1002, the ROM 1006, and the RAM 1008 are changed, transforming the communication device 1000 in part into a particular machine or apparatus, e.g., a presence and IM client, having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an ASIC, because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

At least one embodiment is disclosed and variations, combinations, and/or modifications of the embodiment(s) and/or features of the embodiment(s) made by a person having ordinary skill in the art are within the scope of the disclosure. Alternative embodiments that result from combining, integrating, and/or omitting features of the embodiment(s) are also within the scope of the disclosure. Where numerical ranges or limitations are expressly stated, such express ranges or limitations should be understood to include iterative ranges or limitations of like magnitude falling within the expressly stated ranges or limitations (e.g., from about 1 to about 10 includes, 2, 3, 4, etc.; greater than 0.10 includes 0.11, 0.12, 0.13, etc.). For example, whenever a numerical range with a lower limit, $R_l$, and an upper limit, $R_u$, is disclosed, any number falling within the range is specifically disclosed. In particular, the following numbers within the range are specifically disclosed: $R=R_l+k*(R_u-R_l)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed. The use of the term about means±10% of the subsequent number, unless otherwise stated. Use of the term "optionally" with respect to any element of a claim means that the element is required, or alternatively, the element is not required, both alternatives being within the scope of the claim. Use of broader terms such as comprises, includes, and having should be understood to provide support for narrower terms such as consisting of, consisting essentially of, and comprised substantially of. Accordingly, the scope of protection is not limited by the description set out above but is defined by the claims that follow, that scope including all equivalents of the subject matter of the claims. Each and every claim is incorporated as further disclosure into the specification and the claims are embodiment(s) of the present disclosure. The discussion of a reference in the disclosure is not an admission that it is prior art, especially any reference that has a publication date after the priority date of this application. The disclosure of all patents, patent applications, and publications cited in the disclosure are hereby incorporated by reference, to the extent that they provide exemplary, procedural, or other details supplementary to the disclosure.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or int ermediate component whether electrically, mechanically, or otherwise. Other examples of changes, substitutions, and alterations are ascertainable by one skilled in the art and could be made without departing from the spirit and scope disclosed herein.

What is claimed is:

1. A method implemented in a session initiating communication device, the method comprising:

receiving a context preference for a contact from a joining communication device, wherein the context preference comprises a key word and a request by the joining communication device for notification at the joining communication device when a user of the session initiating communication device connects to a communication session associated with the key word;

storing the context preference in a memory;

connecting to the communication session associated with the key word via the session initiating communication device;

transmitting, via a transmitter for display at the joining communication device and after connecting to the communication session associated with the key word, context information associated with the communication session associated with the key word and presence information indicating that the session initiating communication device has connected to the communication session associated with the key word based on the received context preference for the contact, wherein the context information and the presence information are transmitted to the joining communication device without sending an invitation to join the communication session to the joining communication device; and receiving from the joining communication device, via a receiver, a request from the contact to connect to the communication session.

2. The method of claim 1, wherein the presence information rises text that describes a status of the contact.

3. The method of claim 2, wherein the key word comprises text describing a topic, a task, an activity, a project, or a goal of the communication session.

4. The method of claim 1, wherein the request is automatically granted by the session initiating communication device.

5. The method of claim 4, further comprising prompting the user to remove the contact from the communication session after granting the request.

6. The method of claim 1, wherein the request is displayed on the session initiating communication device and an option is presented whether to grant the request.

7. A session initiating communication device comprising:
a processor;
a memory coupled to the processor; and
a presence and instant messaging (IM) client stored in the memory that, when executed by the processor:
receives a context preference for a contact from a joining communication device, wherein the context preference comprises a key word and a request by the joining communication device for notification at the joining device when a user of the session initiating communication device connects to a communication session associated with the key word;
stores the context preference in the memory;
connects to the communication session associated with the key word;
transmits to a terminal context information associated with the communication session associated with the key word and presence information indicating that the terminal has connected to the communication session associated with the key word based on the received context preference for the contact after connecting to the communication session associated with the key word, wherein the context information and the presence information are transmitted to the joining communication device without sending an invitation to join the communication session to the joining communication device; and
receives from the joining communication device a request from the contact to connect to the communication session.

8. The session initiating communication device of claim 7, wherein the presence information comprises text that describes a status of the contact.

9. The session initiating communication device of claim 7, wherein the key word comprises text that describes a topic, a task, an activity, a project, or a goal of the communication session.

10. The session initiating communication device of claim 7, wherein the request is automatically granted by the session initiating communication device.

11. The session initiating communication device of claim 7, further comprising a display configured to display a prompt to remove the contact at the joining communication device from the communication session.

12. The session initiating communication device of claim 7, further comprising a display configured to display the request and an option whether to grant the request.

* * * * *

UNITED STATES PATENT AND TRADEMARK OFFICE
CERTIFICATE OF CORRECTION

PATENT NO.         : 9,450,898 B2                                      Page 1 of 1
APPLICATION NO.    : 13/655731
DATED              : September 20, 2016
INVENTOR(S)        : Kurupacheril et al.

It is certified that error appears in the above-identified patent and that said Letters Patent is hereby corrected as shown below:

In the Claims

Column 13, Line 26, Claim 2 should read:
The method of claim 1, wherein the presence information comprises text that describes a status of the contact.

Signed and Sealed this
Third Day of January, 2017

Michelle K. Lee
*Director of the United States Patent and Trademark Office*